Dec. 24, 1957

C. E. LOMAX 2,817,712

AUTOMATIC TELEPHONE SYSTEMS PROVIDED WITH RESTRICTED PARTY LINES

Filed Nov. 18, 1953

8 Sheets-Sheet 1

INVENTOR.
Clarence E. Lomax
BY
Smith, Olsen, Baird & Gulbrandsen Attys.

Dec. 24, 1957 C. E. LOMAX 2,817,712

AUTOMATIC TELEPHONE SYSTEMS PROVIDED WITH RESTRICTED PARTY LINES

Filed Nov. 18, 1953 8 Sheets-Sheet 2

INVENTOR.
Clarence E. Lomax

BY

Smith, Olsen, Baird & Gulbrandsen Attys.

INVENTOR.
Clarence E. Lomax
BY
Smith, Olsen, Baird & Gulbrandsen Attys.

INVENTOR.
Clarence E. Lomax
BY
Smith, Olsen, Baird & Gulbrandsen
Attys.

Dec. 24, 1957 C. E. LOMAX 2,817,712

AUTOMATIC TELEPHONE SYSTEMS PROVIDED WITH RESTRICTED PARTY LINES

Filed Nov. 18, 1953 8 Sheets-Sheet 5

INVENTOR.
Clarence E. Lomax
BY
Smith, Olsen, Baird & Guldrandsen Attys.

Dec. 24, 1957 C. E. LOMAX 2,817,712

AUTOMATIC TELEPHONE SYSTEMS PROVIDED WITH RESTRICTED PARTY LINES

Filed Nov. 18, 1953 8 Sheets-Sheet 6

INVENTOR.
Clarence E. Lomax

BY

Smith, Olsen, Baird & Gulbrandsen Attys.

Dec. 24, 1957 C. E. LOMAX 2,817,712

AUTOMATIC TELEPHONE SYSTEMS PROVIDED WITH RESTRICTED PARTY LINES

Filed Nov. 18, 1953 8 Sheets-Sheet 7

INVENTOR.
Clarence E. Lomax

BY

Smith, Olsen, Baird & Gulbrandsen Attys.

Dec. 24, 1957 C. E. LOMAX 2,817,712

AUTOMATIC TELEPHONE SYSTEMS PROVIDED WITH RESTRICTED PARTY LINES

Filed Nov. 18, 1953 8 Sheets-Sheet 8

INVENTOR.
Clarence E. Lomax
BY
Smith, Olsen, Baird & Gulbrandsen Attys.

United States Patent Office 2,817,712

Patented Dec. 24, 1957

2,817,712

AUTOMATIC TELEPHONE SYSTEMS PROVIDED WITH RESTRICTED PARTY LINES

Clarence E. Lomax, Chicago, Ill., assignor to General Telephone Laboratories, Incorporated, a corporation of Delaware Application November 18, 1953, Serial No. 392,893

14 Claims. (Cl. 179—18)

The present invention relates to automatic telephone systems provided with party subscriber lines that are variously restricted against the completion of trunk calls and that include fewer operatively connected stations than a given maximum number which they are adapted to serve.

It is a general object of the present invention to provide in an automatic telephone system of the character noted, including automatic switching links that are taken into use by calling subscriber lines and that are selectively operative to register either trunk calls over a number of groups of trunk lines or local calls to particular called stations on particular called party lines, an arrangement for testing in conjunction with a registered trunk call whether the particular calling subscriber line is restricted against the completion of a trunk call over the particular called group of trunk lines and for testing in conjunction with a registered local call whether the particular called station on the particular called party line is operatively connected thereto.

Another object of the invention is to provide a telephone system of the character described, wherein the testing arrangement includes equipment common to the switching links and operative to carry out simultaneously the two different tests mentioned in the different switching links in which trunk and local calls are respectively registered.

Another object of the invention is to provide a telephone system of the character described, wherein the common equipment also controls in conjunction with a registered local call, selective ringing over the called party line for the purpose of selectively signalling the particular called station thereon.

A further object of the invention is to provide a telephone system of the character described, wherein the proper one of the two tests mentioned, depending upon whether a trunk call or a local call is registered in the switching link, is performed directly over the wiper set of the switching link involved.

A still further object of the invention is to provide a telephone system of the character described, wherein the proper one of the two tests mentioned is performed over the switching link involved by the transmission of matched pulses or signals thereover from the common equipment mentioned.

Further features of the invention pertain to the particular arrangement of the circuit elements of the telephone system, whereby the above-outlined and additional operating features thereof are attained.

Figures 1, 9:
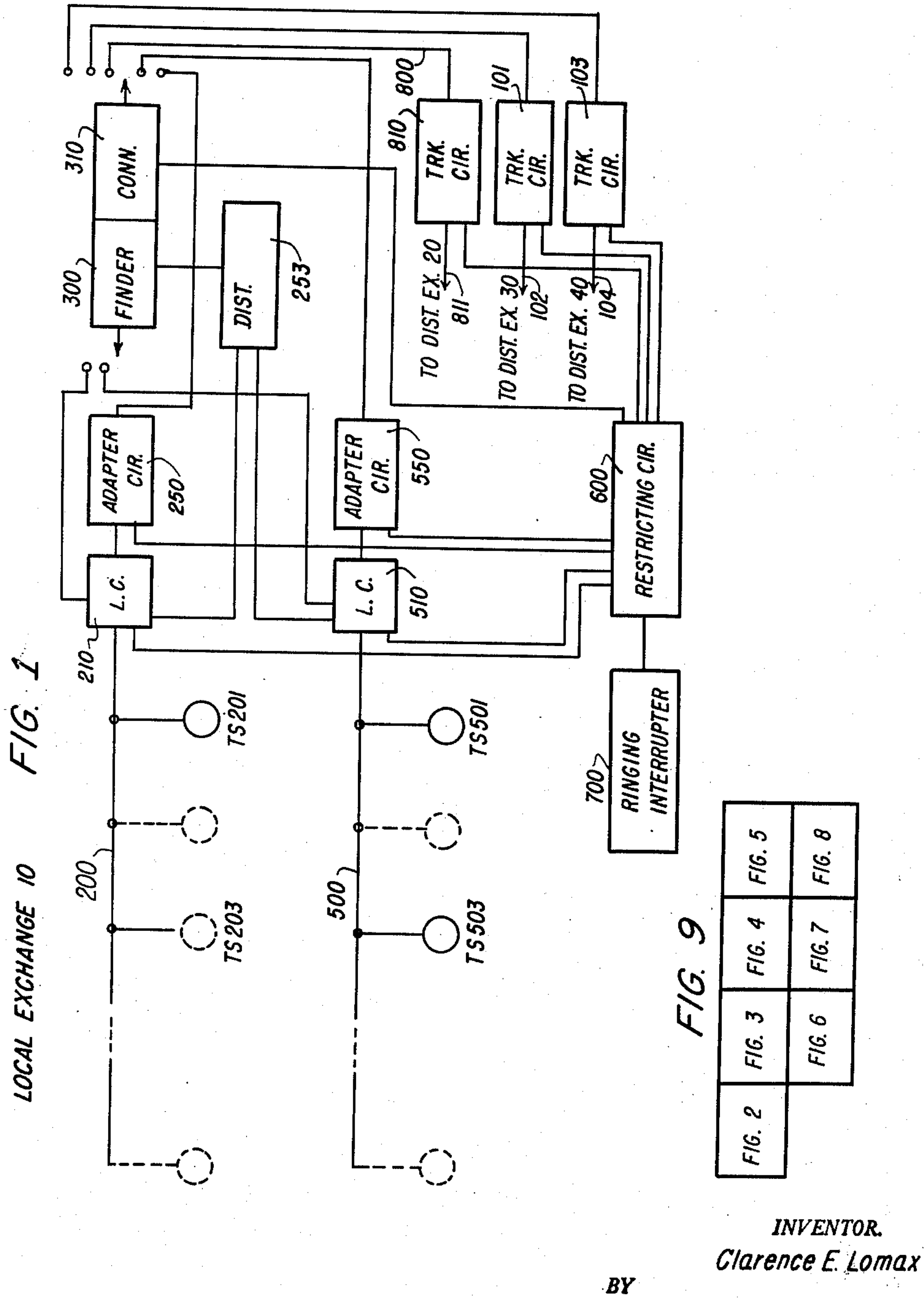
Figure 3:
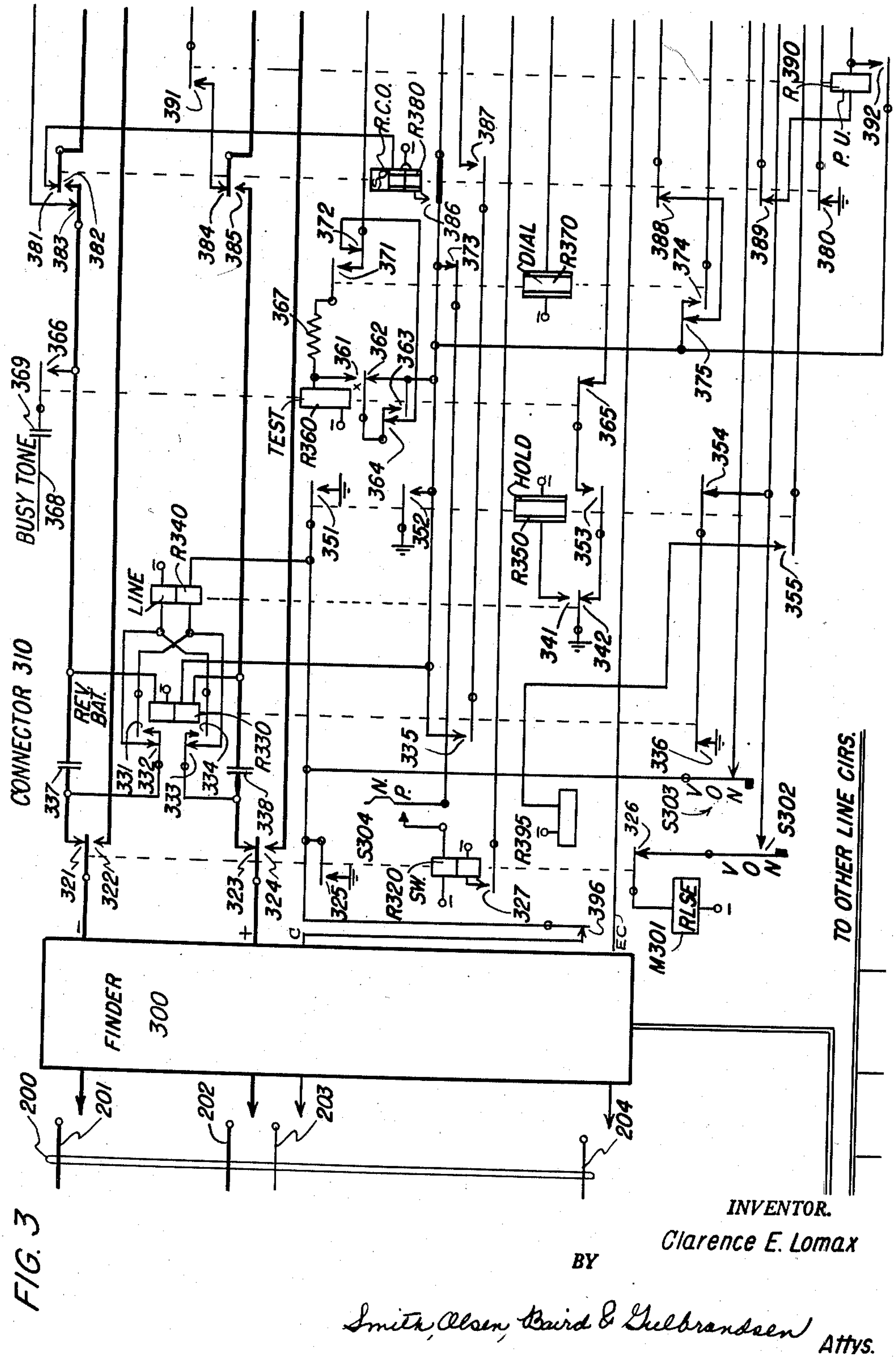
Figure 4:
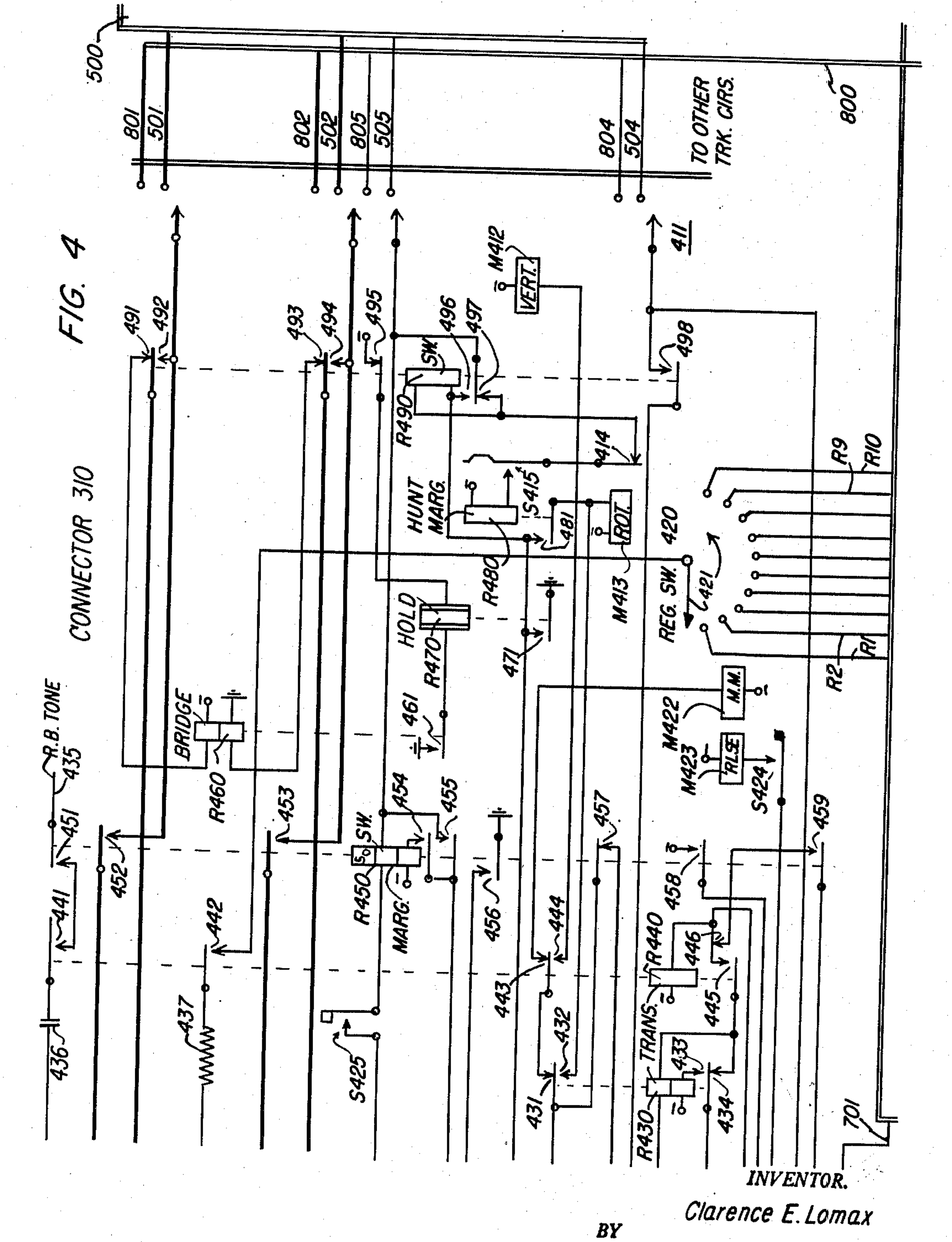
Figure 6:
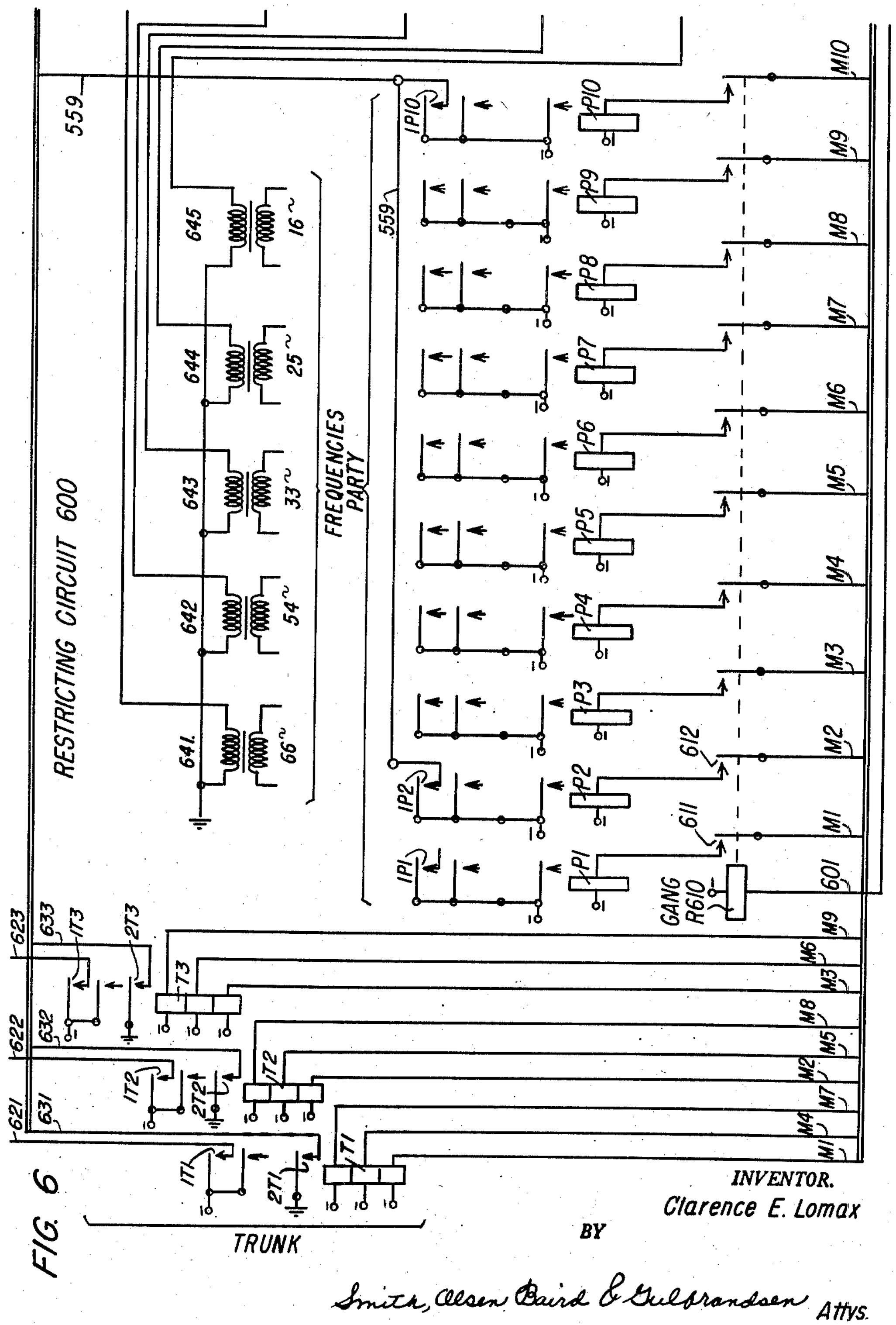
Figure 7:
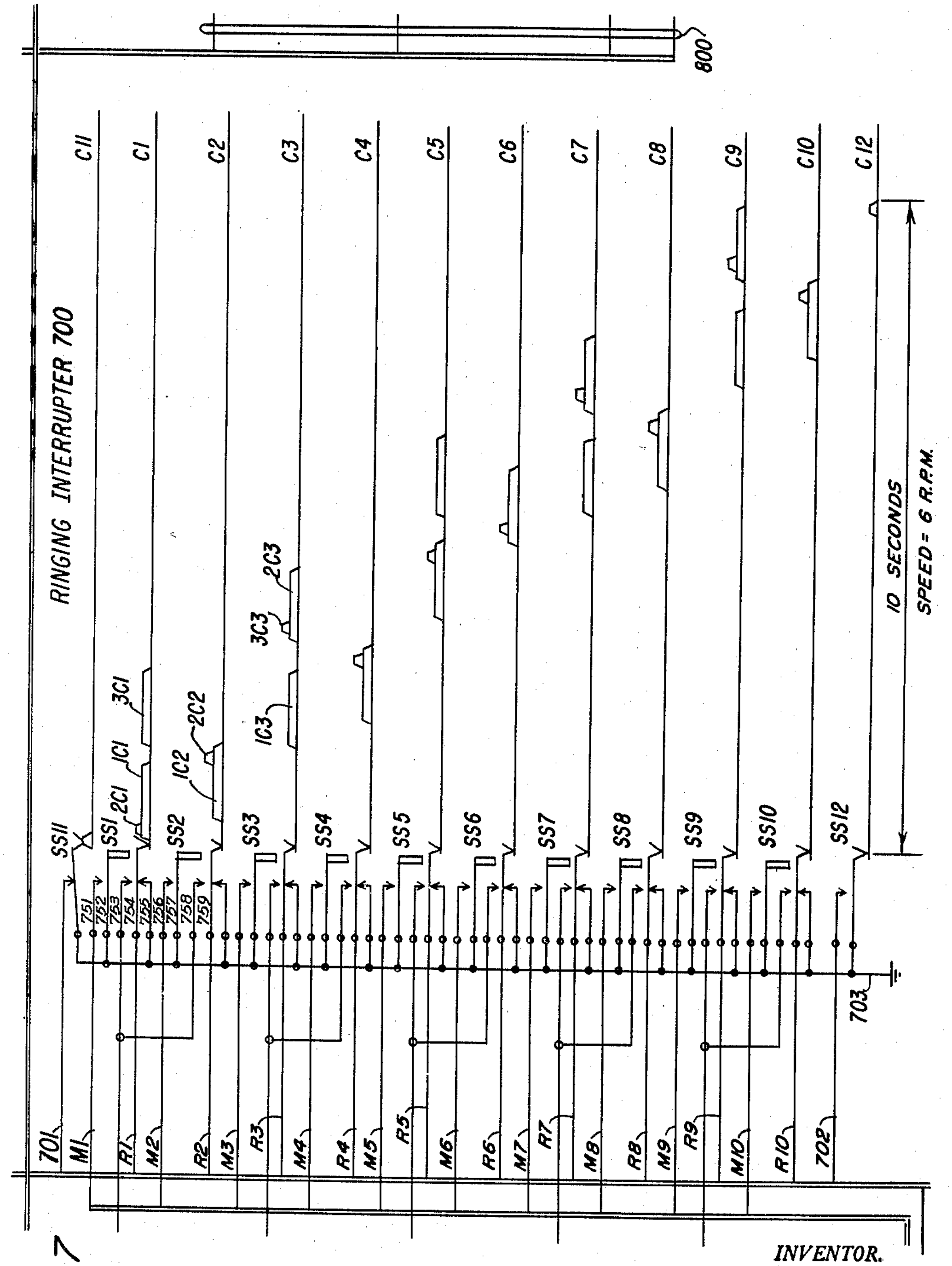
Figure 8:
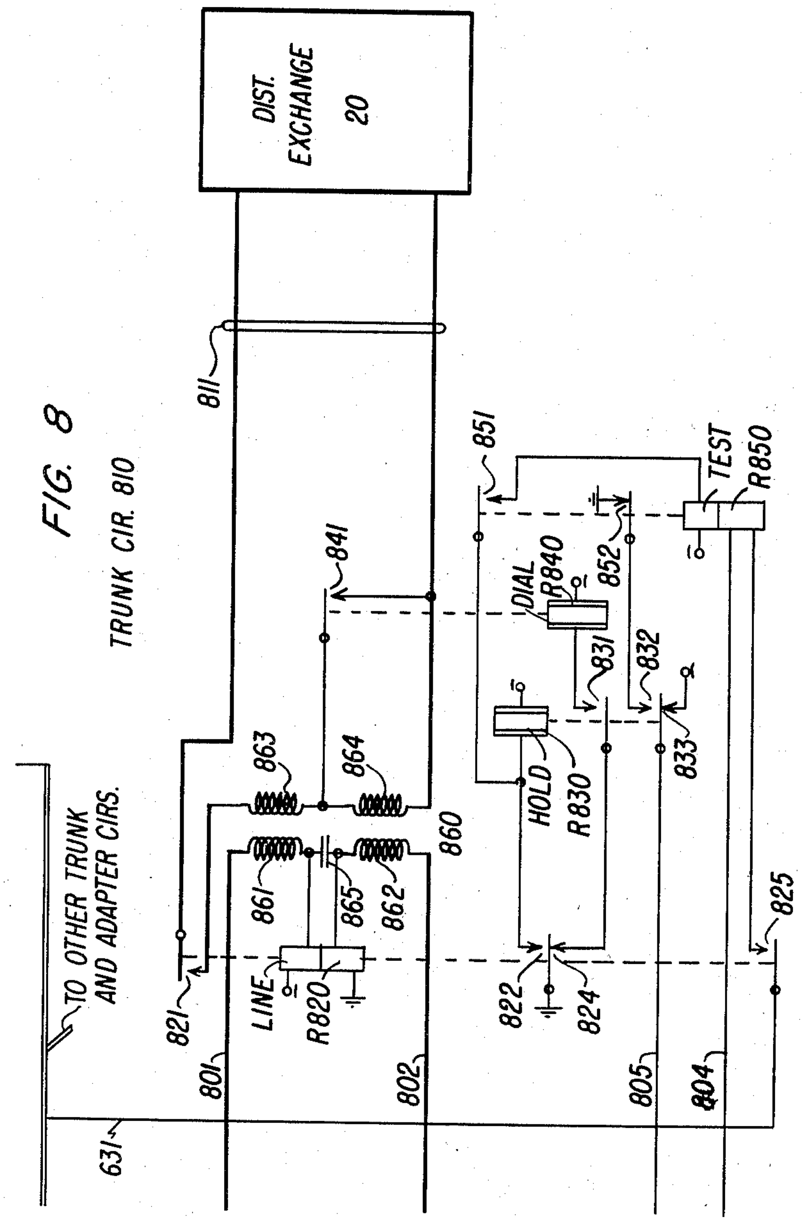

The invention, both as to its organization and method of operation, together with further objects and advantages thereof, will best be understood by reference to the following specification taken in connection with the accompanying drawings, in which Figure 1 is a diagrammatic illustration of a telephone system incorporating apparatus embodying the present invention; Figs. 2 to 8, inclusive, illustrate the details of certain of the apparatus incorporated in the telephone system; and Fig. 9 illustrates the manner of combining Figs. 2 to 8, inclusive, to form a unified diagram. More particularly, Figs. 2 and 5, respectively illustrate the details of two of the party subscriber lines and the associated line circuits and the adapter circuits; Figs. 3 and 4 illustrate the details of one of the trunk-hunting connectors; Fig. 6 illustrates the details of the restricting circuit; Fig. 7 illustrates the details of the ringing interrupter; and Fig. 8 illustrates the details of one of the trunk circuits.

Referring now to Fig. 1 of the drawings, there is illustrated an automatic telephone system that comprises a local exchange 10 and a plurality of distant exchanges 20, 30 and 40. The local exchange 10 is of the automatic type and comprises a plurality of party subscriber lines 200, 500, etc.; while the distant exchanges 20, 30 and 40 are of any suitable type. The local exchange 10 is interconnected with the distant exchange 20 by a plurality of trunk lines 811, etc., and interconnected with the distant exchange 30 by a plurality of trunk lines 102, etc., and interconnected with the distant exchange 40 by a plurality of trunk lines 104, etc. Each of the party subscriber lines 200, 500, etc. is adapted to serve a maximum of ten individual stations, although fewer stations may be actually operatively connected thereto. For purpose of illustration, it may be assumed that on each of the party subscriber lines 200 and 500 the second and tenth stations are unequipped for service thereto, or may have been disconnected.

Also the local exchange 10 comprises line circuits 210, 510, etc., individual to the party subscriber lines 200, 500, etc., and adapter circuits 250, 550, etc., individual to the party subscriber lines that have one or more unequipped stations thereon. Further, the local exchange 10 comprises a plurality of finder-trunk hunting connector links, one of which is illustrated as consisting of the finder 300 and the trunk hunting connector 310. Associated with the line circuits 210, 510, etc., and with the links 300—310, etc., is a distributor 253. The trunk lines 811, 102, 104, etc., are terminated by individual trunk circuits 810, 101, 103, etc. Further, the local exchange 10 comprises a restricting circuit 600 and a ringing interrupter 700, common to the links.

In the arrangement, the finders 300, etc., have access to the party subscriber lines 200, 500, etc.; while the connector 310, etc., have access to the party subscriber lines 200, 500, etc., and to the trunk lines 811, 102, 104, etc. More particularly, the finders 300, etc., and the connector 310, etc., are of the Strowger type; and the connectors 310, etc., have access to the trunk lines 811, etc., in the seventh levels thereof, have access to the trunk lines 102, etc., in the eighth levels thereof, and have access to the trunk lines 104, etc., in the ninth levels thereof. Finally, it may be assumed that in the remaining levels of the connectors 310, etc., access is had to the party subscriber lines 200, 500, etc., and to operator and service switchboards, not shown.

In the arrangement, certain of the party subscriber lines 200, 500, etc. are restricted against access to certain of the trunk groups; and for purpose of illustration it may be assumed that the party subscriber lines 200 and 500 are restricted against access to the group of trunk lines 102, etc., extending to the distant exchange 30 and to the group of trunk lines 104, etc., extending to the distant exchange 40. Thus it will be understood that calling party subscriber lines 200, 500, etc., in the local exchange 10 may complete local calls and trunk calls only to the distant exchange 20.

Figure 2:
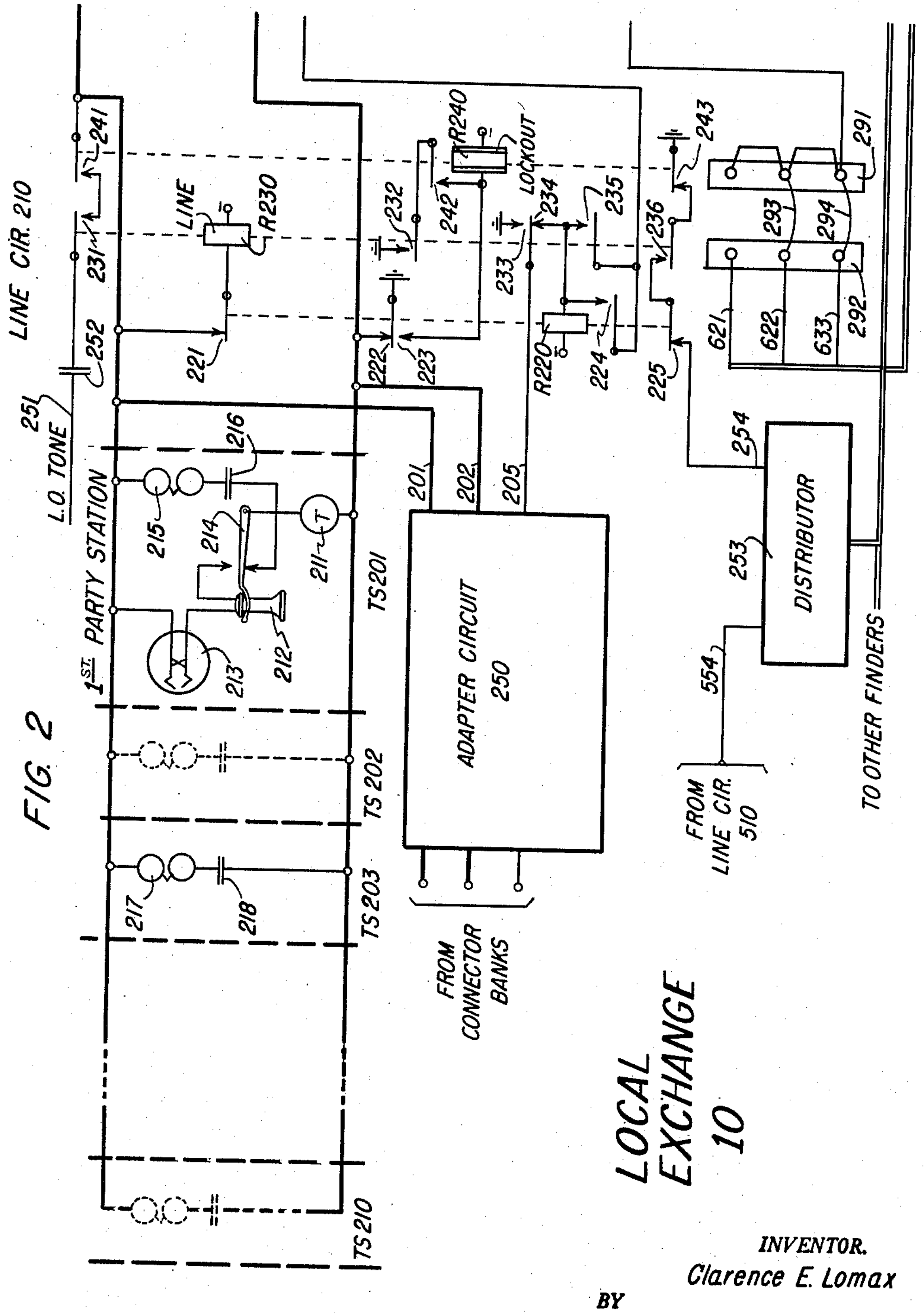

Referring now to Fig. 2, the party stations TS201, etc., operatively connected to the party subscriber line 200 comprise conventional station equipment; the line circuit 210 individual to the party subscriber line 200 comprises a relay group including a cut off relay R220, a line relay R230 and a lockout relay R240; and the adapter circuit 250 individual to the party subscriber line 200 comprises a relay group, not shown.

Figure 5:
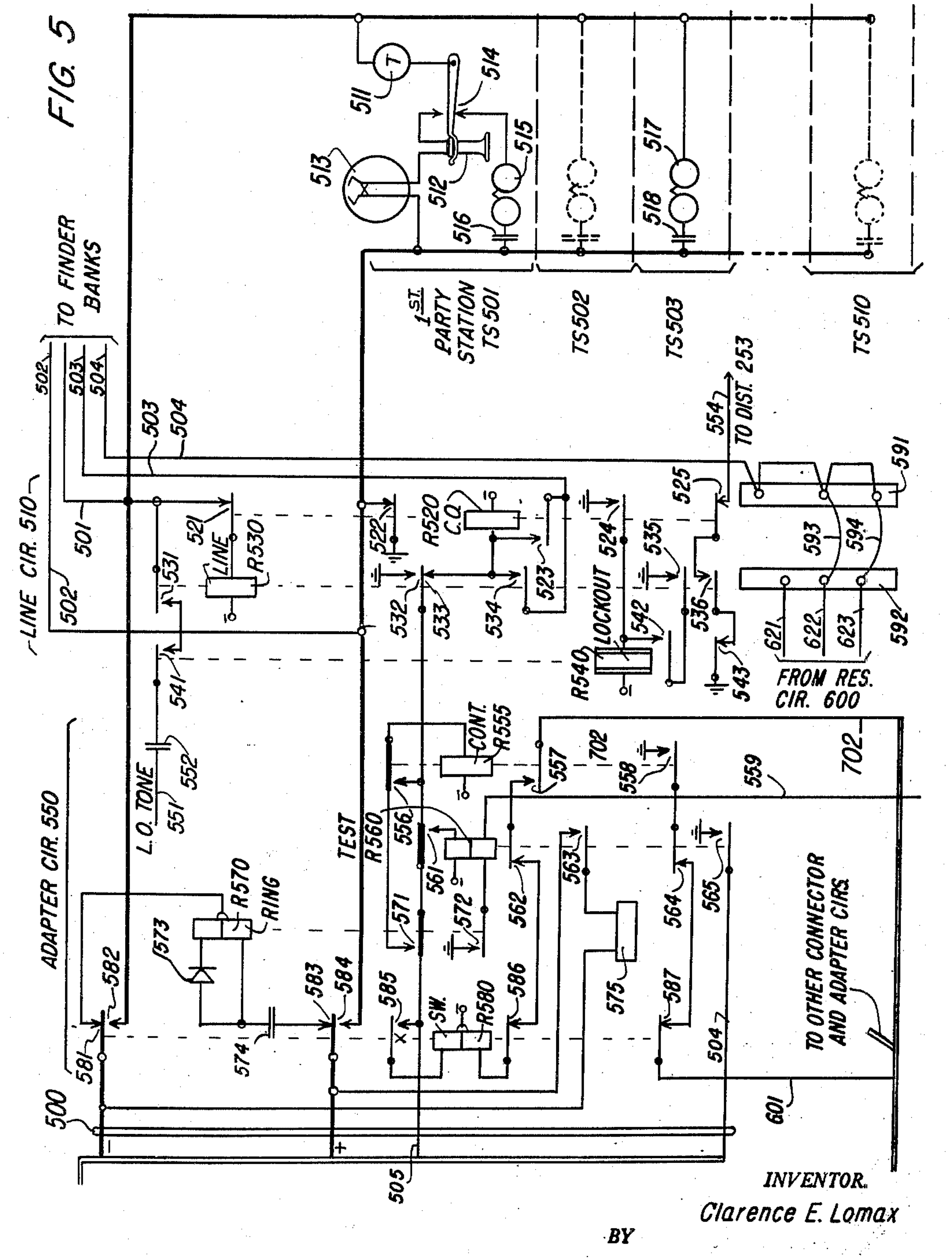

Referring now to Fig. 5, the party stations TS501, etc., operatively connected to the party subscriber line 500 comprise conventional station equipment; the line circuit 510 individual to the party subscriber line 500 comprises a relay group including a cut off relay R520, a line relay R530 and a lockout relay R540; and the adapter circuit 550 individual to the party subscriber line 500 comprises a relay group including a control relay R555, a test relay R560, a ring relay R570 and a switch relay R580.

Each of the trunk circuits may be identical to the trunk circuit 810, shown in Fig. 8, that comprises a repeater 860 and a relay group including a line relay R820, a hold relay R830, a dial relay R840 and a test relay R850. The distributor 253 may be of any suitable type; and similarly the finders 300, etc., may be of any suitable Strowger type.

Each of the trunk hunting connectors may be identical to the trunk hunting connector 310 shown in Figs. 3 and 4; the connector 310 comprising a Strowger mechanism 411 including a wiper set, a vertical magnet M412 for driving the wiper carriage step by step in the vertical direction away from its normal vertical position, a rotary magnet M413 for driving the wiper carriage step by step in the rotary direction away from its normal rotary position, and a release magnet M301 for releasing the wiper carriage and for causing it to be returned into its normal rotary and vertical positions. Also associated with the wiper carriage of the Strowger mechanism 411 are two sets of switch springs S302 and S303 that are operated when the wiper carriage is driven in the vertical direction away from its normal vertical position, and two sets of switch springs S304 and S415 that are operated when the wiper carriage is driven in the vertical direction into its seventh, eighth and ninth levels. Also, the connector 310 comprises a register switch 420 of the minor type, including a wiper 421 provided with an associated contact bank, a rotary magnet M422 for driving the wiper 421 step by step in the counterclockwise direction away from its normal rotary position, and a release magnet M423 for releasing the wiper 421 and for causing it to be returned into its normal rotary position. Also, two sets of switch springs S424 and S425 are operatively associated with the wiper 421 and operated when it is rotated one step in the counterclockwise direction away from its normal rotary position. Further, the connector 310 comprises a relay group, including a switch relay R320, a reverse battery relay R330, a line relay R340, a hold relay R350, a test relay R360, a dial relay R370, a ring cut off relay R380, a pickup relay R390, a release relay R395, two transfer relays R430 and R440, a switch relay R450, a bridge relay R460, a hold relay R470, a hunt relay R480 and a switch relay R490.

Referring to Fig. 6, the restricting circuit 600 constitutes common equipment and includes ten party relays P1 to P10, inclusive, three trunk relays T1 to T3, inclusive, and a gang relay R610.

Referring to Fig. 7, the ringing interrupter 700 constitutes common equipment and includes a drum that is continuously rotated at a constant speed of 6 R. P. M.; which drum carries ten ringing cams C1 to C10, inclusive, a pickup cam C11 and a cut-through cam C12. Associated with the twelve cams C1 to C12, inclusive, are twelve switches SS1 to SS12, inclusive, respectively. Also associated with the ringing interrupter 700 are five ringing transformers 641 to 645, inclusive, also shown in Fig. 6; the five ringing transformers 641 to 645, inclusive, being respectively supplied with the ringing frequencies 66 cycles, 54 cycles, 33 cycles, 25 cycles and 16 cycles.

In the arrangement, the ten switches SS1 to SS10, inclusive, respectively control the party relays P1 to P10, inclusive, and respectively govern the application of the five ringing frequencies to ten ringing conductors R1 to R10, inclusive, commonly extending to the various connectors 310, etc. Also, the nine ringing cams C1 to C9, inclusive, control the trunk relays T1 to T3, inclusive. More particularly, the ringing cams C1, C4 and C7 commonly control the trunk relay T1; the ringing cams C2, C5 and C8 commonly control the trunk relay T2; and the ringing cams C3, C6 and C9 commonly control the trunk relay T3. In the ringing interrupter 700, the cams C1, C3, C5, C7 and C9 each comprises two elongated projections for the purpose of bringing about two ringing operations of the respectively associated switches SS1, SS3, SS5, SS7 and SS9, in each ringing cycle; and the cams C2, C4, C6, C8 and C10 each comprises a single elongated projection for the purpose of bringing about one ringing operation of the respectively associated switches SS2, SS4, SS6, SS8 and SS10, in each ringing cycle. The various projections carried by the cams C1, etc., are staggered in time relation so as to bring about a certain sequence of operation of the switches SS1, etc., as explained more fully hereinafter. Also, each of the cams C1, etc. carries a short high projection for the purpose of governing the associated switches SS1, etc., so as to effect the control of the party relays P1, etc., and the trunk relays T1, etc. By way of illustration, it is noted that the cam C1 comprises the two spaced-apart elongated projections 1C1 and 3C1, as well as the short high projection 2C1 that are employed for the purposes previously mentioned.

Considering now the general operation of the continuously operating interrupter 700, in conjunction with the restricting circuit 600, it is noted that in each ringing cycle of the ringing interrupter 700, the pickup cam C11 closes and then opens the associated switch SS11; the ringing cams C1 to C10, inclusive, then selectively control the respective switches SS1 to SS10, inclusive; and then the cut-through cam C12 closes and then opens the associated switch SS12. Specifically, the switches SS1, etc. are controlled to bring about the sequential connection of the corresponding ringing frequencies to the corresponding ringing conductors R1, etc., and to bring about the sequential application of ground potential to ten marking conductors M1 to M10, inclusive. The sequential application of ground potential to the ten marking conductors M1 to M10, inclusive, brings about sequential operation of the party relays P1 to P10, inclusive, in the event the gang relay R610 occupies its operated position; while the sequential application of ground potential to the nine marking conductors M1 to M9, inclusive, brings about three cycles of sequential operation of the trunk relays T1 to T3, inclusive. In the arrangement, each of the elongated projections 1C1, etc., corresponds to a time interval of 1.0 second; whereas each of the short high projections 2C1, etc. corresponds to a time interval of about 0.1 second.

In the telephone system, each party subscriber substation TS1, etc. is assigned a three-digit directory number individual thereto, the first and second digits being indicative of the contacts sets in the connectors 110, etc., terminating the associated party line, and the third digit being indicative of the desired ringing setting of the register switch in the connector in use. Similarly, each of the trunk line groups 811, etc., 102, etc., and 104, etc., is assigned a one-digit directory number individual thereto, the directory numbers of the three trunk groups mentioned being 7, 8 and 9.

Turning now to the restricting circuit 600, it is noted that connections are made between the party relays P1 and P10, inclusive, and the test relay in the adapter circuit of each party subscriber line corresponding to the stations on the party subscriber line that are unequipped. For example, it has been previously assumed that the second and tenth stations on the party subscriber line 500 are unequipped; whereby the contact 1P2 of the second party relay P2 and the contact 1P10 of the tenth party relay P10 are commonly connected or strapped to a conductor 559 extending to the lower winding of the test relay R560 in the adapter circuit 550 individual to the party subscriber line 500, for a purpose more fully explained hereinafter. Also connections are made to the line circuits of the party subscriber lines that are restricted against the completion of trunk calls to any one of the distant exchanges 20, 30 and 40; and connections are made to the various trunk circuits 810, etc. Specifically, the trunk relays T1, T2 and T3 apply negative battery potential to the conductors 621, 622 and 623 extending to the various line circuits 210, 510, etc.; and in the line circuit 210 the conductors 622 and 623 are connected via the straps 293 and 294 at the terminal blocks 291 and 292 to the EC conductor 204 of the party subscriber line 200, since it has been previously assumed that the party subscriber line 200 is restricted against the completion of trunk calls to the distant exchanges 30 and 40. On the other hand, in the trunk circuit 210, the conductor 621 is not strapped to the EC conductor 204 of the party subscriber line 200, since it has been assumed that trunk connections may be completed therefrom to the distant exchange 20. Further, the trunk relays T1, T2 and T3 apply positive ground potential to the conductors 631, 632, 633, etc., extending to the various trunk circuits 810, etc., in the different groups terminating the different groups of trunk lines 811, etc. Specifically, the conductor 631 extends to the trunk circuit 810 terminating the trunk line 811 extending to the distant exchange 20, the conductors 621—631, 622—632, etc., being arranged in pairs for the trunk service restricting purpose, as explained more fully hereinafter.

The mode of operation of the apparatus incorporated in the telephone system will be better understood from the following description of calls involving the various subscriber lines and stations.

First assuming that a call is initiated at the first party station TS201 operatively connected to the party subscriber line 200, the subscriber removes the receiver 212 from its associated hook, operating the hookswitch 214 so as to bridge the line conductors 201 and 202 of the party line 200, completing a circuit for operating the line relay R230. Upon operating the line relay R230 completes, at the contacts 233, a path for applying ground potential to the C conductor 205 extending to the adapter circuit 250, whereby the party line 200 is marked as busy to the connectors 310, etc., having access thereto. Also the line relay R230 completes, at the contacts 235, a path for applying battery potential via the winding of the cut off relay R220 to the C conductor 203 of the party line 200 appearing before the finders 300, etc. Further, the line relay R230 completes, at the contacts 236, a path for applying ground potential to the start conductor 254 extending to the distributor 253; whereby the distributor 253 assigns an idle link, such, for example, as that illustrated, and controls operation of the finder 300 thereof to find the calling party line 200. When the finder 300 finds the party line 200, ground potential in the finder 300 is applied to the C conductor 203, and a loop circuit is completed between the line conductors 201 and 202 of the party line 200 and the windings of the line relay R340 in the connector 310. The application of ground potential to the C conductor 203 of the party line 200 completes a circuit for operating the cut off relay R220; whereby the latter relay interrupts, at the contacts 221 and 222, the circuit for retaining operated the line relay R230. Also the cut off relay R220 completes, at the contacts 223, a circuit for operating the lockout relay R240; completes, at the contacts 224, a holding circuit for energizing the winding thereof and a path connecting the grounded C conductor 203 to the C conductor 205; and interrupts, at the contacts 225, the path for applying ground potential to the distributor start conductor 254 thereby to dismiss the distributor 253 at this time.

The loop circuit extending between the first party station TS201 on the party line 200 and the upper and lower windings of the line relay R340 includes the contacts 321, 323, 332 and 333 and the grounded C conductor extending back to the finder 300; whereby the line relay R340 operates to complete, at the contacts 341, a circuit for operating the hold relay R350. Upon operating, the hold relay R350 completes, at the contacts 351, a multiple path for applying ground potential to the C conductor extending back to the finder 300; which application of ground potential upon the C conductor mentioned completes a circuit, including the set of switch springs S303, for operating the transfer relay R440. At this time, the call initiated at the first party station TS201 has been extended via the party line 200 and the finder 300 to the connector 310, and the connector 310 is conditioned to respond to the digit or digits to be dialed at the calling station TS201.

Now assuming that this call is to be extended to the first party station TS501 on the party subscriber line 500, the subscriber at the calling first party station TS201 dials the three-digit directory number of the called first party station TS501, which might be 241. The line relay R340 follows the impulses of the first digit 2; and each time the line relay R340 restores and then reoperates, it interrupts and then recompletes, at the contacts 341, the circuit for energizing the winding of the hold relay R350, whereby the latter relay is retained in its operated position during dialing, as it is of the slow-to-release type. Also, each time the line relay R340 restores and then reoperates, it completes and then interrupts, at the contacts 342, a circuit, including the contacts 353, 365 and 457, for energizing the winding of the dial relay R370; and a multiple circuit, also including the contacts 431 and 444, for operating the vertical magnet M412. Accordingly, the dial relay R370 operates and remains operated during dialing as it is of the slow-to-release type, and the vertical magnet M412 is operated and restored twice in succession driving the wiper carriage of the Strowger mechanism 411 two steps in the vertical direction away from its normal vertical position. Upon operating, the dial relay R370 completes, at the contacts 374, a holding circuit for retaining operated the transfer relay R440. When the wiper carriage of the Strowger mechanism 411 is operated one step in the vertical direction away from its normal vertical position, the sets of switch springs S302 and S303 are operated. The set of switch springs S303 is opearted in order to interrupt the original circuit for operating the transfer relay R440.

At the conclusion of the first digit 2, the line relay R340 is retained in its operated position retaining operated hold relay R350 and causing the dial relay R370 to restore shortly thereafter. Upon restoring, the dial relay R370 interrupts, at the contacts 374, the holding circuit for energizing the winding of the transfer relay R440, after completing, at the contacts 375, a series circuit for energizing the upper winding of the transfer relay R430 and the winding of the transfer relay R440; whereby the transfer relay R430 is operated and the transfer relay R440 is retained in its operated position.

The subscriber at the calling station TS201 then proceeds to dial the second digit 4; whereby the line relay R340 again folows retaining operated the hold relay R350. Each time the line relay R340 restores and then reoperates, it completes and then interrupts, at the contacts 342, the previously traced circuit for operating the dial relay R370; and a multiple circuit, also including the contacts 432, for operating the rotary magnet M413. Accordingly, the dial relay R370 operates and remains operated during dialing, and the rotary magnet M413 is operated and restores four times driving the wiper carriage of the Strowger mechanism 411 four steps in the rotary direction away from its normal rotary position.

Upon operating the dial relay R370 completes, at the contacts 374, a holding circuit for energizing the lower winding of the transfer relay R430; and interrupts, at the contacts 375, the previously traced holding circuit for energizing in series the upper winding of the transfer relay R430 and the winding of the transfer relay R440. Accordingly, at this time, the transfer relay R430 is retained in its operated poistion and the transfer relay R440 restores.

At the conclusion of the second digit 4, the line relay R340 is retained in its operated position retaining operated the hold relay R350 and causing the dial relay R370 to restore shortly thereafter. Upon restoring, the dial relay R370 interrupts, at the contacts 374, the holding circuit for energizing the lower winding of the transfer relay R430, causing the latter relay to restore.

The subscriber at the calling station TS201 then proceeds to dial the third digit 1, whereby the line relay R340 again follows, retaining operated the hold relay R350. Also when the line relay R340 restores and then reoperates, it completes and then interrupts, at the contacts 342, the previously traced circuit for operating the dial relay R370; and a multiple circuit, including the contacts 431 and 443, for operating the rotary magnet M422. Accordingly, the dial relay R370 operates and remains operated during dialing and the rotary magnet M422 is operated and restored once driving the wiper 421 of the register switch 420 one step in the counterclockwise direction away from its normal rotary position. When the wiper 421 is thus driven one step in the counterclockwise direction away from its normal rotary position, the sets of switch springs S424 and S425 are operated.

At the conclusion of the third digit 1, the line relay R340 is retained in its operated position, retaining operated the hold relay R350 and causing the dial relay R370 to restore shortly thereafter. Thus at the conclusion of the second digit 4, the wiper carriage of the Strowger mechanism 411 was set in the vertical and rotary directions to engage the contact set terminating the called party line 500; however, testing of the idle or busy condition of the selected party line 500 by the test relay R360 was delayed by virtue of the open position of the set of switch springs S425. However, at the conclusion of the third digit 1, the wiper 421 has selected the first ringing conductor R1 and the set of switch springs S425 is closed; whereby the test relay R360 tests the idle or busy condition of the called party line 500. Specifically, battery potential is applied by way of the winding of the test relay R360, the resistor 367, the contacts 371, the set of switch springs S425, the upper winding of the switch relay R450, and the control wiper of the wiper set to the C conductor 505 of the called party line 500.

First assuming that the called party line 500 is busy at this time, ground potential is applied to the C conductor 505 thereof, completing the above traced circuit for energizing the winding of the test relay R360 in series with the upper winding of the switch relay R450; whereby the test relay R360 operates through its first step, it being of the two-step type, but the switch relay R450 is not operated, as it is of the marginal type. When the test relay R360 operates through its first step, it prepares, at the contacts 361, another test circuit, excluding the resistors 367. Shortly thereafter, when the dial relay R370 restores, it interrupts, at the contacts 371, the initially completed test circuit previously traced; and completes, at the contacts 372, the alternative test circuit, also including the contacts 361 and 364; which test circuit excludes the resistor 367. Accordingly, the test relay R360 then operates through its second step, although the switch relay R450 is not operated, it being of the marginal type, as previously noted. When the test relay R360 operates through its second step, it completes, at the contacts 363, a holding circuit, for energizing the winding thereof; and interrupts, at the contacts 364, the above-traced series test circuit for energizing the upper winding of the switch relay R450. Also the test relay R360 completes, at the contacts 366, a connection, including the condenser 369, between the busy-tone conductor 368 and the negative line of the finder 300, and consequently a connection to the negative line conductor of the party line 200; whereby busy-tone is returned to the calling party station TS201 indicating to the subscriber thereat that the desired connection may not be had at this time due to the busy condition of the called party line 500.

The subscriber at the calling station TS201 then disconnects interrupting the loop circuit for retaining operated the line relay R340 causing the hold relay R350 to restore shortly thereafter. Upon restoring, the hold relay R350 interrupts, at the contacts 351, the path for applying ground potential to the C conductor extending back to the finder 300; whereby the finder 300 is released effecting the restoration of the cut off relay R220 in the line circuit 200. Upon restoring, the cut off relay R220 effects the restoration of the lockout relay R240 shortly thereafter; and again connects, at the contacts 221 and 222, the line relay R230 to the line conductors 201 and 202 of the party line 200; and battery potential via the winding of the cut off relay R220 is again applied to the C conductor 205 extending to the adapter circuit 250 so as again to make the party line 200 as idle to the connectors 310, etc., having access thereto.

Upon restoring the hold relay R350 completes, at the contacts 354, multiple circuits, respectively including the sets of switch springs S302 and S424, for operating the release magnets M301 and M423. Upon operating, the release magnet M301 releases the wiper carriage of the Strowger mechanism 411 causing it to be returned into its normal rotary and vertical positions; and upon operating the release magnet M423 releases the wiper 421 of the register switch 420 causing it to be returned in the clockwise direction back into its normal rotary position. Finally, the hold relay R350 interrupts, at the contacts 352, the holding circuit for retaining operated the test relay R360. When the wiper carriage of the Strowger mechanism 411 is thus released, the sets of switch springs S302 and S303 are operated, the set of switch springs S303 being operated again to connect battery potential by way of the winding of the transfer relay R440 to the C conductor extending back to the finder 300, and the set of switch springs S302 being operated to interrupt the operating circuit for the release magnet M301. When the wiper 421 of the register switch 420 is thus released, the sets of switch springs S424 and S425 are operated, the set of switch springs S424 being operated to interrupt the operating circuit for the release magnet M423, and the set of switch springs S425 being operated to interrupt the original circuit for the test relay R360. At this time, the connector 310 is completely released and available for further use.

Now assume that after the connector 310 has been operated in accordance with the third digit 1 dialed at the calling station TS201 and at the conclusion of the dialing of the directory number 241 of the called first party station TS501 on the called party line 500, the called party line 500 is idle. In this case, battery potential via the winding of the cut off relay R520 is applied to the C conductor 505 of the called party line 500, completing a path substantially identical to that previously traced for short-circuiting in series the winding of the test relay R360, the upper winding of the switch relay R450 and the winding of the cut off relay R520. Accordingly, in this event the test relay R360 is not operated; and shortly thereafter when the dial relay R370 restores, it interrupts, at the contacts 371, the above traced series path for short-circuiting the windings noted. Also, the dial relay R370 completes, at the contacts 372, a direct path, including the contacts 364, 362 and 352, for applying ground potential via the set of switch springs S425 to one terminal of the upper winding of the switch relay R450; whereby, at this time, a direct circuit is completed for energizing the upper winding of the switch relay R450 in series with the winding of the cut off relay R520. Accordingly, the switch relay R450 operates shortly thereafter, it being of the slow-to-operate type, completing, at the contacts 454, a holding circuit for energizing the lower winding thereof. Also, the switch relay R450 completes, at the contacts 455, a path for applying direct ground potential to the C conductor 505 of the called party line 500; whereby the cut off relay R520 is operated to effect operation of the lockout relay R540; and to interrupt, at the contacts 521 and 522, the connection of the line relay R530 to the line conductors of the party line 500. Also this application of direct ground potential to the C conductor 505 of the called party line 500 marks it as busy to the other connectors having access thereto.

Also upon operating, the switch relay R450 completes, at the contacts 459, a circuit for reoperating the transfer relay R440; the latter relay completes, at the contacts 445, a holding circuit for energizing the winding thereof in series with the upper winding of the transfer relay R430 so that the latter relay is reoperated. Upon reoperating, the transfer relay R440 completes, at the contacts 441, a connection, including the contacts 383 and 451, and the condenser 436, between the ring-back tone conductor 435 and the negative line conductor of the finder 300; whereby ring-back tone current is returned over the negative line conductor of the party line 200 to the calling station TS201 indicating to the subscriber thereat that the called first party station TS501 is being rung.

Subsequently, the continuously operated ringing interrupter 700 brings about the closure of the switch SS1 by the pickup cam C11; whereby ground potential is applied to the pickup conductor 701 so as to complete a circuit for operating the pickup relay R390. Upon operating the pickup relay R390 completes, at the contacts 392, a holding circuit for energizing the winding thereof; and completes, at the contacts 391, a ringing connection between the first ringing conductor R1 and the ring relay R570 in the adapter circuit 550. This ringing connection extends from the first ringing conductor R1 via the wiper 421 of the register swich 420 and the engaged first contact in the associated contact bank, the contacts 442, the resistor 437, the contacts 391, 384 and 453 and the positive wiper to the positive line conductor 502 of the called party line 500; and from battery potential via the upper winding of the ring cut off relay R380, the contacts 381 and 452, and the negative wiper to the negative line conductor 501 of the called party line 500. Also, at this time, the upper and lower windings of the ring relay R570 in the adapter circuit 550 are bridged across the line conductors 501 and 502; the connection including the contacts 581 and 583 and the condenser 574; the copper oxide rectifier 573 being included in series with the upper winding of the ring relay R570.

Subsequently, the ringing interrupter 700 opens the set of switch springs SS11 interrupting the application of ground potential to the pickup conductor 701; however, without effect at this time, since a holding circuit is completed for retaining operated the pickup relay R390. Still subsequently, the front end of the elongated projection 1C1 carried by the cam C1 rides under the control spring 754; whereby the first ringing conductor R1 is disconnected from the grounded conductor 703 and is connected to the conductor extending to the first ringing transformer 641 so that ringing current of the frequency of 66 cycles is projected thereover energizing the upper and lower windings of the ring relay R570 in parallel relation and energizing the upper winding of the ring cut off relay R380 in series relation therewith. When this circuit is thus completed, the rectifier 573 effects half-wave rectification so that the upper winding of the ring relay R570 is energized with pulsating components of direct current causing the latter to operate; however, the ring cut off relay R380 will not operate in this fundamentally alternating current circuit. Upon operating, the ring relay R570 completes, at the contacts 571, a circuit, for operating the control relay R555; and completes, at the contacts 572, a path for applying positive ground potential to one terminal of the lower winding of the test relay R560; which application of positive ground potential comprises a portion of a test circuit for the test relay R560 that will not be completed in the present example by virtue of the circumstance that the called first party station TS501 on the called party line 500 is equipped. Upon operating, the control relay R555 completes, at the contacts 556, a holding circuit for energizing the winding thereof; and completes, at the contacts 558, a circuit, including the conductor 601, for operating the gang relay R610. Upon operating, the gang relay R610 completes, at the contacts 611, etc., connections between the windings of the party relays P1, etc., and the corresponding marking conductors M1, etc.; thereby to prepare for operation the party relays P1, etc.

Still subsequently, the short high projection 2C1 rides under the control spring 754 in order to connect the grounded conductor 703 to the first marking conductor M1; whereby a circuit is completed for operating the first party relay P1, and a multiple circuit is completed for energizing the lower winding of the first trunk relay T1, causing the latter relay to operate. The operation of the first trunk relay T1 brings about the application of negative battery potential to the conductors 621, etc., extending to the line circuits 210, etc., and brings about the application of positive ground potential to the conductors 631, etc., extending to the trunk circuits 810, etc.; which operations are without effect in the present example since a trunk call is not involved. Upon operating, the first party relay P1 completes, at the contacts 1P1, etc., connections for applying negative battery potential to the various test relays in the adapter circuits in which the first party stations are unequipped upon the corresponding party lines. In the present example, the operation of the first party relay P1 is of no effect, since the contacts 1P1, etc., are not connected to the strap 559, and consequently to the lower winding of the test relay R560 in the adapter circuit individual to the called party line 510.

Still subsequently, the short high projection 2C1 rides out from under the control spring 754, thereby to interrupt the multiple circuits for operating the first party relay P1 and the first trunk relay T1. However, the projection of the ringing current of 66 cycles from the first ringing transformer 641 over the first ringing conductor R1 is continued so as to retain the ring relay R570 in the adapter circuit 550 in its operated position at this time.

Still subsequently, the elongated projection 1C1 rides out from under the control spring 754; whereby the first ringing conductor R1 is disconnected from the first ringing transformer 641 and is reconnected to the grounded conductor 703; whereby the projection of the ringing current of 66 cycles from the first ringing transformer 641 over the first ringing conductor R1 is terminated bringing about the restoration of the ring relay R570. Upon restoring, the ring relay R570 interrupts, at the contacts 572, the previously mentioned path for applying positive ground potential to the one terminal of the lower winding of the test relay R560, so as to interrupt a further point in the test circuit for energizing the lower winding thereof.

Still subsequently, the short high projection 2C2 carried on the cam C2 effects operation of the switch SS2, so that the grounded conductors 703 is connected to the second marking conductor M2 bringing about operation of the second party relay P2 and the second trunk relay T2. The operation of the second trunk relay T2 is without effect in the present example, since a trunk call is not involved; and similarly, the operation of the second party relay P2 is without effect, since the switch SS2 is also operated to project the ringing current of the frequency of 66 cycles from the first ringing transformer 641 over the second ringing conductor R2 that is not engaged by the wiper 421 of the register switch 420; whereby the ring relay R570 does not reoperate. Upon operating, the second party relay P2 completes, at the contacts 1P2, a path for applying negative battery potential to the strap 559 and consequently to the other terminal of the lower terminal of the test relay R560; however, without effect in the present example, since the ring relay R570 does not occupy its operated position at this time. Thus in the present example, there is no matching between the operated position of the ring relay R570 and the operated position of any one of the party relays P1, P2, etc.; whereby the test relay R560 in the adapter circuit 550 is not operated. In the subsequent operation of the ringing interrupter 700, the third party relay P3 and the third trunk relay T3 are operated; and still subsequently, the party relays P4, etc. are operated in sequence, while the trunk relays T1, etc. are reoperated. However, none of these operations of the party relays P3, etc., and the trunk relays T3, etc., are effective in the present example, since there is no matching between the operated position of the ring relay R570 and one of the party relays P1, etc., that is strapped to the conductor 559, and since a trunk call is not involved.

Still subsequently, the cut-through cam C12 operates the switch SS12 so as to connect the grounded conductor 703 to the conductor 702, completing a circuit for energizing the lower winding of the switch relay R580; whereby the latter relay operates to complete, at the contacts 585, a holding circuit for energizing the upper winding thereof. Ultimately, the cut-through cam C12 opens the switch SS12 to interrupt a further point in the circuit for energizing the lower winding of the switch relay R580. Also, upon operating, the switch relay R580 interrupts, at the contacts 581 and 583, the connection between the line conductors 501 and 502 of the party line 500 and the ring relay R570; and completes, at the contacts 582 and 584, connections between the line conductors 501 and 502 and the corresponding sections of the line conductors extending to the party stations TS501, etc. Finally, the switch relay R580 interrupts, at the contacts 587, the circuit for retaining operated the gang relay R610, so that the party relays P1, etc., are disconnected from the marking conductors M1, etc.

Accordingly, during the first cycle of operation of the ringing interrupter 700, a first test was made to determine whether or not a trunk call was involved, as explained more fully hereinafter, and a second test was made to determine whether or not the particular called first party station TS501 was equipped, and accordingly whether the present call should be extended. In the present example, it was determined that the called first party station TS501 was equipped and that the present call was to be extended, since the test relay R560 in the adapter circuit 550 was not operated; whereby at the conclusion of the first cycle of operation of the ringing interrupter 700, the switch relay R580 in the adapter circuit 550 was operated to extend the connection directly from the connector 310 via the called party line 500 to the party stations TS501, etc.

The ringing interrupter 700 then proceeds through a second cycle; whereby two splashes of ringing current of 66 cycles are transmitted over the first ringing conductor R1, as a consequence of the cooperation of the two elongated projections 1C1 and 3C1 carried by the cam C1 with the switch SS1, each of these splashes of ringing current being of one-second duration, the two splashes of ringing current being separated by a time interval of 0.2 second. The circuit for projecting the ringing current extends from the first ringing conductor R1 over the previously traced connection to the positive line conductor 502 of the party line 500, and from battery potential via the previously traced connection to the negative line conductor 501 of the party line 500, the line conductors 501 and 502 being connected, at the contacts 584 and 582, to the line conductor sections thereof extending to the party stations TS501, etc., the ringer 515 at the first party station TS501 bridging the line conductors of the party line 500 via a connection, including the condenser 516, the hookswitch 514 and the transmitter 511. Accordingly, the ringer 515 at the first party station TS501 is operated by the two splashes of ringing current, thereby signalling the subscriber thereat; however, the ring cut off relay R380 is not operated by this alternating current. The operation of the ringer 515 at the first party station TS501, described above, continues in the third and following cycles of the ringing interrupter 700 and until the call is answered on the called party line 500 or until the call is abandoned at the calling party station TS201.

When the subscriber at the called first party station TS501 answers the call by removing the receiver 512 from the switchhook 514, the circuit for operating the ringer 515 is interrupted, and a bridge circuit is completed at the hookswitch 514 via the transmitter 511, the receiver 512, and the dial 513, across the line conductors of the called party line 500; whereby a circuit is completed for energizing the upper winding of the ring cut off relay R380 causing the latter relay to operate shortly thereafter, it being of the combination slow-to-operate and slow-to-release type. This circuit extends from ground potential either during a ringing period or a silent period via the first ringing conductor R1 over the previously traced path and ultimately to battery potential at the upper winding of the ring cut off relay R380. Upon operating, the ring cut off relay R380 completes, at the contacts 386, a holding circuit, for energizing the lower winding thereof; and interrupts, at the contacts 381 and 384, points in the circuit for projecting ringing current over the called party line 500. Also, the ring cut off relay R380 interrupts, at the contacts 383, the previously traced path for returning ring-back tone current over the negative line conductor of the calling party line 200; and interrupts, at the contacts 388, the holding circuit for retaining operated the transfer relays R430 and R440. Further, the ring cut off relay R380 interrupts, at the contacts 389, the holding circuit for retaining operated the pickup relay R390; whereby the latter relay restores interrupting, at the contacts 391, a further point in the ringing circuit. Finally, the ring cut off relay R330 completes, at the contacts 382 and 385, a loop circuit, for energizing in series the upper and lower windings of the reverse battery relay R330. This circuit includes the contacts 382, 385, 452 and 453, and the negative and positive wipers of the wiper set of the Strowger mechanism 411; and when this circuit is completed, the reverse battery relay R330 operates to complete, at the contacts 335, a multiple holding circuit, including the contacts 387 and 456, for energizing in series the upper and lower windings thereof; and interrupts, at the contacts 336, a further point in the multiple circuit for operating the release magnets M301 and M423. Finally, the reverse battery relay R330 reverses, at the contacts 331, 332, 333 and 334, the polarity of the loop circuit extending between the upper and lower windings of the line relay R340 and the calling party station TS201; which reversal of polarity over the line conductors of the party line 200 may be employed in the line circuit 210 for metering or other purposes in a conventional manner, not shown. Finally, the loop circuit extending from the calling party station TS201 to the upper and lower windings of the line relay R340 is operatively connected by the condensers 337 and 338 to the loop circuit extending between the called party station TS501 and the upper and lower windings of the reverse battery relay R330; whereby the subscriber at the calling party station TS201 and the subscriber at the called party station TS501 may converse with each other.

At the conclusion of the established connection, when the subscriber at the calling party station TS201 disconnects, the loop circuit extending to the line relay R340 is interrupted causing the latter relay to restore and effect the restoration of the hold relay R350 shortly thereafter; and when the subscriber at the called party station TS501 disconnects, the loop circuit extending to the reverse battery relay R330 is interrupted causing the latter relay to restore. Upon restoring, the reverse battery relay R330 and the hold relay R350 respectively complete, at the contacts 336 and 354, the previously traced circuits for operating the release magnets M301 and M423; whereupon the Strowger mechanism 411 and the register switch 420 are released in the manner previously explained. Upon restoring, the reverse battery relay R330 interrupts, at the contacts 335, a multiple holding circuit, including the contacts 387 and 456, for retaining operated the ring cut off relay R380 and the switch relay R450, causing the relays mentioned to restore, the ring cut off relay R380 being slow-to-release, as it is of the combination slow-to-operate and slow-to-release type. When ground potential is thus removed from the C conductor extending back to the finder 300, as a consequence of the restoration of the hold relay R350, the finder 300 is released and the cut off relay R220 in the line circuit 210 is restored effecting the subsequent restoration of the lockout relay R240, so as again to mark the party line 200 as idle to the connector 310, etc., having access thereto. When the connector 310 is thus released, ground potential is removed from the C conductor 505 of the party line 500, thereby to interrupt the holding circuit for energizing the upper winding of the switch relay R580 and the holding circuit for energizing the winding of the control relay R555, both in the adapter circuit 550, causing these relays to restore. Also the removal of ground potential from the C conductor 505 effects the restoration of the cut off relay R520 in the line circuit 510 so as to bring about the subsequent restoration of the lockout relay R540. At this time, battery potential is returned via the winding of the cut off relay R520 and the contacts 533 to the C conductor 505 again marking the party line 500 as idle to the connectors 310, etc., having access thereto. Moreover, upon restoring, the switch relay R580 in the adapter circuit 550 again connects, at the contacts 581 and 583, the upper and lower windings of the ring relay R570 in bridged relation to the line conductors 501 and 502 of the party line, and isolates the two sections of the party line 500, at the contacts 582 and 584.

Accordingly, at this time, the established connection between the calling party station TS201 and the called party station TS501 is released and all of the apparatus involved therein is completely released and available for further use.

Now assuming that the subscriber at the calling party station TS201 on the party line 200 initiates a call and attempts to direct the call to the second party station TS502, that is not operatively connected to the party line 500, the subscriber at the calling party station TS201 after initiating the call dials the directory number 242 that would normally be assigned to the second party station TS502 on the called party line 500; however, in the present example, it has been assumed that the second party station TS502 is unequipped, or disconnected with respect to the line conductors of the party line 500. Again the finder 300 and the connector 310 may be taken into use; and again the Strowger mechanism 411 in the connector 310 is operated to select the called party line 500; all in the manner previously explained. In this case, the third digit 2 is registered in the register switch 420, and the test relay R360 again tests the idle or busy condition of the called party line 500 following the registration of the third digit 2 in the register switch 420; all in the manner described above. Now assuming that the called party line 500 is idle, the switch relay R450 is again operated. In this example, the wiper 420 of the register switch 420 engages the second contact in the associated contact bank terminating the second ringing conductor R2 extending to the ringing interrupter 700. Upon operating, the switch relay R450 effects reoperation of the transfer relays R440 and R430.

Now in the beginning of a first cycle of the ringing interrupter 700, the application of ground potential upon the pickup conductor 701 effects operation of the pickup relay R390; whereby the ringing interrupter 700 subsequently brings about the projection of the ringing current of the frequency of 66 cycles over the second ringing conductor R2 so that the ring relay R570 in the adapter circuit operates; all in the manner previously explained. Upon operating, the ring relay R570 effects operation of the control relay R555; and completes, at the contacts 572, the previously mentioned path for applying positive ground potential to the one terminal of the lower winding of the test relay R560. Now in the present example, the ringing current is projected over the second ringing conductor R2 as a consequence of the operation of the switch SS2, as the front end of the elongated projection 1C2 carried by the cam C2 rides under the control spring 759, closing the contacts between the springs 759 and 758. Subsequently when the high projection 2C2 carried by the cam C2 rides under the control spring 759, the switch SS2 is operated to engage the springs 757 and 756; whereby ground potential is applied to the second marking conductor M2 to effect operation of the second party relay P2, since the gang relay R610 occupies its operated position. Upon operating, the second party relay P2 completes, at the contacts 1P2, the previously mentioned path for applying negative battery potential to the conductor 559 and thence to the other terminal of the lower winding of the test relay R560 in the adapter circuit 550. Accordingly, in the present example, there is effected the simultaneous and matched applications of positive ground potential and negative battery potential to the respective terminals of the lower winding of the test relay R560; whereby the latter relay operates, completing, at the contacts 561, a holding circuit for energizing the upper winding thereof. Also, the test relay R560 interrupts, at the contacts 562, a further point in the circuit for energizing the lower winding of the switch relay R580 so as positively to prevent operation of the latter relay under the control of the ringing interrupter 700 in the present example. Further, the test relay R560 completes, at the contacts 563, a path for bridging the impedance 575 across the line conductors 501 and 502 of the party line 500 and so as to bring about operation of the ring cut off relay R380 in the connector 310, in the manner previously explained, in order to interrupt the projection of ringing current over the party line 500. Finally, the test relay R560 completes, at the contacts 565, a path for applying ground potential to the EC conductor 504 of the party line 500 thereby to complete a circuit, including the contacts 355, for operating the release relay R395. Upon operating, the release relay R395 interrupts, at the contacts 396, the path for returning ground potential over the C conductor extending back to the finder 300; whereby the finder 300 is released effecting the release of the connector 310, in the manner previously explained. When the finder 300 is thus released, ground potential is removed from the C conductor 203 of the party line 200 effecting the restoration of the cut off relay R220 in the line circuit 210. Upon restoring, the cut off relay R220 interrupts, at the contacts 223, the circuit for energizing the winding of the lockout relay R240; however, the latter relay does not immediately restore, as it is of the slow-to-release type. Also, upon restoring, the cut off relay R220 reconnects, at the contacts 221 and 222, the line relay R230 across the line conductors of the party line 200; whereby the latter relay is reoperated over the loop circuit extending back to the calling party station TS201. Upon reoperating, the line relay R230 completes, at the contacts 232, a holding circuit for retaining operated the lockout relay R240; and recompletes, at the contacts 233, the path for applying ground potential to the C conductor 205 extending to the adapter circuit 250, so as to retain the subscriber line 200 marked as busy to the connector 310, etc., having access thereto. Finally, the line relay R230 and the lockout relay R240 respectively complete, at the contacts 231 and 241, a connection, including the condenser 252, between the lockout tone conductor 251 and the negative line conductor 201 of the party line 200; whereby lockout tone current is returned to the calling party station TS201, indicating to the subscriber thereat that the party line 200 is locked out of service in the line circuit 210 as a consequence of the attempt to extend the present call to the called unequipped second station TS502 on the called party line 500. Of course, the release of the connector 310 effects the release of the adapter circuit 550 and the line circuit 510 so that the party line 500 is again marked as idle to the connector 310, etc., having access thereto.

When the subscriber at the calling party station TS201 receives the lockout tone, he disconnects, effecting the restoration of the line relay R230 in the line circuit 210 and the subsequent restoration of the lockout relay R240; whereby the line circuit 210 is again released marking the party line 200 as idle to the connector 310, etc., having access thereto. At this time, the connection from the calling party station TS201 to the called party line 500 is released and all of the apparatus involved therein is completely released and available for further use.

In view of the foregoing description of the operation of the adapter circuit 550 in conjunction with the ringing interrupter 700 and in conjunction with the connector 310, it will be understood that when the Strowger mechanism 411 is operated to select the called party line 500, the further operation of the adapter circuit 550 either to switch the connection forward to the called party station on the party line 500 or to bring about the release of the connector 310 is dependent upon the character of the third digit of the director number registered in the register switch 420 and identifying the particular called party station on the party line 500. In the present example, when either of the third digits 2 and 0 is registered in the register switch 420, the test relay R560 in the adapter circuit 550 is operated in the first cycle of operation of the ringing interrupter 700 bringing about the release of the finder 300 and the connector 310 and the consequent operation of the line circuit 210 associated with the calling party line 200 into its lockout position. On the other hand, in the present example, when a third digit, other than the digits 2 and 0, is registered in the register switch 420, after the Strowger mechanism 411 has been operated to select the called party line 500, the test relay R560 in the adapter circuit 550 is not operated in the first cycle of the ringing interrupter 700 due to the failure of the match between the operated position of the ring relay R570 in the adapter circuit 550 and the corresponding party relays P1, P3, P4, P5, P6, P7, P8 and P9 in the restricting circuit 600; whereby the switch relay R580 in the adapter circuit 560 is operated at the conclusion of the first cycle of the ringing interrupter 700, so that the selected ringing current is projected over the line conductors of the called party line 500 on to the called party station TS501, etc., in the second or next following cycle of operation of the ringing interrupter 700. As previously noted, the matching between the operation of the ring relay R570 in the adapter circuit 550 and the operation of the party relays P2 and P10 in the restricting circuit 600 is dependent upon the strapping 559; which strapping is, of course, dependent upon the unequipped party stations, upon the party line 500, as previously explained.

In conjunction with the operation of the ringing interrupter 700, it is again noted that on a fully equipped party line, the first and second party stations are rung with the first ringing frequency of 66 cycles; the third and fourth party stations are rung with the second ringing frequency of 54 cycles, etc. However, the projection of either two splashes or one splash of the first ringing frequency of 66 cycles over the called party line is indicative of whether the call is intended for the subscriber at the first party station or the subscriber at the second party station thereon. In other words, the one and two frequency ring upon the called party line comprises a code indicative of the particular one of the two rung stations for which the call is intended. Of course, it will be understood that only the ringers at the first and second party stations on the party line respond to the first ringing frequency of 66 cycles, the arrangement of the ringers at the other pairs of party stations on the party subscriber line being identical with respect to the second, etc., ringing frequencies of 54 cycles, etc.

Further, it will be understood that in connection with a party line having ten equipped party stations thereon, no adapter circuit is ordinarily necessary; and the line circuit thereof is terminated directly in the banks of the Strowger mechanisms of the various connectors 310, etc.

In the foregoing description of the mode of operation of the connector 310 in conjunction with the adapter circuit 550 individual to the party subscriber line 500, it was assumed that the knock-down and forced release of the connector 310 was brought about by virtue of the fact that the second and tenth party stations TS502 and TS510 were unequipped or disconnected from the party line 500; however, the arrangement described may be employed even though the party stations TS502 and TS510 are equipped, when it is desired to restrict calls thereto. In other words, the arrangement positively restricts the completion of local calls to the party stations TS502 and TS510 on the party line 500, bringing about the knock-down of the connector 310, and regardless of whether the party stations TS502 and TS510 are equipped or merely restricted.

Now assuming that the subscriber at the calling party station TS201 initiates a trunk call to the distant exchange 20 against which the party line 200 is not restricted, the finder 300 and the connector 310 may again be taken into use. In this example, the subscriber dials the single digit 7 comprising the directory number of the group of trunk lines 811, etc., extending to the distant exchange 20. The line relay R340 follows the single digit 7 retaining operated the hold relay R350 and effecting operation of the dial relay R370, as well as the operation and restoration seven times of the vertical magnet M412 in the manner previously explained. Accordingly, the wiper carriage of the Strowger mechanism 411 is operated to the seventh level in which there is terminated the groups of trunks 800, etc., extending to the trunk circuits 810, etc., terminating the trunk lines 811, etc.; whereby the sets of switch springs S304 and S415 are operated. Upon operating, the set of switch springs S304 prepares a circuit for energizing the upper winding of the switch relay R320; and upon operating the set of switch springs S415 prepares a test circuit involving the hunt relay R480 and the switch relay R490 to the C wiper of the wiper set of the Strowger mechanism 411.

Shortly following the conclusion of the single digit 7, the dial relay R370 restores completing, at the contacts 373, the previously mentioned circuit, including the contacts 352 and the set of switch springs S304, for energizing the upper winding of the switch relay R320; whereby the latter relay operates. Upon operating, the switch relay R320 completes, at the contacts 325, a multiple path for applying ground potential to the C conductor extending back to the finder 300, in order to insure that the finder 300 is retained in its operated position at this time. Also the switch relay R320 interrupts, at the contacts 321 and 323, the loop circuit extending from the calling party station TS201 to the line relay R340; and completes, at the contacts 322 and 324, an alternative loop circuit from the calling party station TS201 to the bridge relay R460; whereby the line relay R340 restores and the bridge relay R460 operates. Upon operating, the bridge relay R460 completes, at the contacts 461, a circuit for operating the hold relay R470; and upon operating the hold relay R470 completes, at the contacts 471, a holding circuit, including the contacts 327, for energizing the lower winding of the switch relay R320. Upon restoring, the line relay R340 interrupts, at the contacts 341, the circuit for energizing the winding of the hold relay R350 so as to cause the latter relay to restore shortly thereafter. Also the line relay R340, upon restoring, completes, at the contacts 342, the previously traced circuit for reoperating the dial relay R370 and for transmitting a simple ground impulse to the rotary magnet M413 by virtue of the operated position of the transfer relay R430. Accordingly, the rotary magnet M413 operates and then restores incident to the restoration of the hold relay R350; whereby the wiper carriage of the Strowger mechanism 411 is driven one step in the rotary direction to select the first trunk in the previously selected group, including the trunk 800. Upon restoring, the hold relay R350 effects the restoration of the transfer relays R430 and R440 and the subsequent restoration of the dial relay R370.

At this time, the subsequent operation of the connector 310 depends upon the idle or busy condition of the selected first trunk in the selected group mentioned; whereby ground potential or battery potential appears upon the C conductor of the selected trunk depending upon the respective busy or idle condition thereof. First assuming that the selected trunk is busy, the presence of ground potential upon the C conductor thereof, and applied to the C wiper of the wiper set, completes a path, including the contacts 497 and 471, for short-circuiting the winding of the switch relay R490; and completes a circuit, including the contacts 497 and 414 and the set of switch springs S415, for operating the hunt relay R480. Upon operating, the hunt relay R480 completes, at the contacts 481, a circuit, including the contacts 471, for operating the rotary magnet M413; whereby the wiper carriage of the Strowger mechanism is driven an additional step in the rotary direction to select the next trunk in the previously selected group, so that the next trunk is tested in the manner explained above.

Now assuming that the trunk 800 extending to the trunk circuit 810 is the first idle trunk in the previously selected group, the wiper carriage 411 is driven step by step in the rotary direction to select the contact set terminating the trunk 800; whereby the presence of battery potential at the contacts 833 upon the C conductor 805 of the trunk 800 marks this trunk as idle. Battery potential applied to the C wiper of the Strowger mechanism 411 completes a path substantially identical to that previously traced for short-circuiting the winding of the hunt relay 480 and a multiple circuit for energizing the winding of the switch relay R490. Accordingly, when the idle trunk 800 is thus tested, the hunt relay R480 does not operate and the switch relay R490 does operate. Upon operating, the switch relay R490 interrupts, at the contacts 497, the previously traced operating circuit therefor; whereby there is completed a holding circuit, including the contacts 471 and 414 and the set of switch springs S415, for energizing the winding of the switch relay R490 in series with the winding of the hunt relay R480, so as to retain the switch relay R490 in its operated position. However, the hunt relay R480 is not operated as it is of the marginal type. Also the switch relay R490 interrupts, at the contacts 491 and 493, the loop circuit extending from the calling party station TS201 to the bridge relay R460; and completes, at the contacts 492 and 494, an alternative loop circuit extending from the calling party station TS201 to the line relay R820 in the trunk circuit 810 so as to cause the latter relay to operate. Upon operating, the line relay R820 completes, at the contacts 822, a circuit for operating the hold relay R830; whereby the latter relay interrupts, at the contacts 833, the path for returning battery potential over the C conductor 805 of the trunk 800; and completes, at the contacts 832, an alternative path for returning ground potential over the C conductor 805. This return of ground potential from the trunk circuit 810 over the C conductor 805 of the trunk 800 completes an alternative holding circuit for energizing the winding of the switch relay R490 in series with the winding of the hunt relay R480 so as to retain the switch relay R490 in its operated position subsequent to the restoration of the hold relay R470.

Also upon operating, the switch relay R490 interrupts, at the contacts 495, the circuit for energizing the winding of the hold relay R470 so as to cause the latter relay to restore shortly thereafter, it being of the slow-to-release type. The restoration of the hold relay R470 is without effect at this time since the return of ground potential over the C conductor 805 of the trunk 800 completes an alternative holding circuit, including the contacts 327 and 496, for energizing the lower winding of the switch relay R320. Further, the switch relay R490 completes, at the contacts 498, a test connection between the EC wiper of the Strowger mechanism 411 and the EC wiper of the finder 300, and consequently a test connection via the EC conductor 204 of the calling party line 200 to the strapping blocks 291 and 292, included in the line circuit 210 individual to the party line 200; which test circuit is employed for a purpose more fully described below. Upon operating, the line relay R820 in the trunk circuit 810 also completes, at the contact 821, a loop circuit, including the coil sections 863 and 864 of the repeater 860, between the line conductors of the trunk line 811 extending to the distant exchange 20; thereby to effect seizure of apparatus, not shown, in the distant exchange 20. Further, the line relay R820 completes, at the contacts 825, a further extension of the previously mentioned test circuit between the EC conductor 804 of the trunk 800 and the conductor 631 extending to the restricting circuit 600 and including the lower winding of the test relay R850.

Accordingly, at this time, there is prepared the previously mentioned test circuit for determining whether the party line 200 is restricted against the completion of trunk calls to the distant exchange 20. More particularly, each time the trunk relay T1 in the restricting circuit 600 operates, it completes, at the contacts 1T1, a path for applying negative battery potential to the conductor 621 extending to the line circuit 210; and completes, at the contacts 2T1, a path for applying positive ground potential to the conductor 631 extending to the trunk circuit 810 terminating the trunk line 811 extending to the distant exchange 20. The conductor 631 extending to the trunk circuit 810 is further extended via the contacts 825, the lower winding of the test relay R850, the EC conductor 804 of the trunk 800, the EC wiper of the Strowger mechanism 411, the contacts 498, the EC wiper of the finder 300 and the EC conductor 204 of the party line 200 to the block 291. However, the EC conductor 204 of the party line 200 is not strapped to the conductor 621; whereby the circuit for energizing the lower winding of the test relay R850 in the trunk circuit 800 is not completed.

Subsequently, when the second trunk relay T2 operates, it completes, at the contacts 1T2 and 2T2, paths for respectively applying negative battery potential and positive ground potential to the conductors 622 and 632; whereby the negative battery potential applied to the conductor 622 extending to the line circuit 210 is forwarded via the strap 293 to the EC conductor 204 of the party line 200 and thence via the previously traced path through the connector 310 to the lower winding of the test relay R850 and thence back over the conductor 631. However, no positive ground potential appears upon the conductor 631, except when the first trunk relay T1 occupies its operated position. Accordingly, in the present example, there is no match between the negative battery potential applied to the conductors 621, etc., extending to the line circuit 210 and the positive ground potential applied to the conductor 631 extending to the trunk circuit 810; whereby the test relay R850 in the trunk circuit 810 is not operated, indicating that the party line 200 is not restricted against the extension of trunk calls to the distant exchange 20.

Subsequently, the subscriber at the calling party station 201 may dial one or more digits effecting corresponding control of the line relay R820 in the trunk circuit 810; whereby the impulses are repeated, at the contacts 821, over the trunk line 811 to the apparatus in the distant exchange 20. Also the dial relay R840 is operated during dialing in order to close the contacts 841 so as to improve impulsing over the trunk line 811 in a conventional manner. The subsequent completion of the connection in the distant exchange 20 is entirely conventional; and at the termination of the established connection the subscriber at the calling party station TS201 disconnects effecting the restoration of the line relay R820 in the trunk circuit 810; whereby the latter relay opens, at the contacts 821, the trunk line 811 bringing about the release of the apparatus in the distant exchange 20. Also upon restoring, the line relay R820 interrupts, at the contacts 822, the circuit for retaining operated the hold relay R830; whereby the latter relay restores shortly thereafter, it being of the slow-to-release type. Upon restoring, the hold relay R830 interrupts, at the contacts 832, the path for returning ground potential over the C conductor 805; and recompletes, at the contacts 833, the path for returning battery potential over the C conductor 805 of the trunk 800. When ground potential is thus removed from the C conductor 805, the multiple holding circuit for retaining operated the switch relays R320 and R490 are interrupted. Upon restoring, the switch relay R320 interrupts, at the contacts 325, the path for returning ground potential over the C conductor extending back to the finder 300 so as to bring about the release of the finder 300, in the manner previously explained. Further, the switch relay R320 completes, at the contacts 326, the circuit for operating the release magnet M301 so as to effect the release of the connector 310, in the manner previously described. At this time, the line circuit 210 is controlled to mark the party line 200 as idle to the connectors 310, etc., having access thereto; and the trunk circuit 810 is controlled to mark the trunk 800 as idle to the connector 310, etc., having access thereto. At this time, the established connection between the calling party station TS201 and the distant exchange 20 is completely released and all of the apparatus involved therein is completely released and available for further use.

Now assuming that the subscriber at the calling station TS201 initiates a call and attempts to direct the call either to the distant exchange 30 or to the distant exchange 40, the corresponding single directory digit 8 or 9 is dialed after the initiation of the call. Again, the finder 300 and the connector 310 may be taken into use; whereby the connector 310 responds to the single digit 8 or 9 to select the corresponding group of trunks and then an idle trunk in the selected group, all in the manner previously described. Following the selection of the trunk circuit terminating the idle trunk line extending to the distant exchange 30 or 40, a test is made through the connector 310 to the trunk circuit in use in order to determine whether the calling party line 200 is restricted against the completion of the corresponding trunk call; and in the present example, the restriction will be found to be present, whereby the forced release of the connector 310 and the operation of the line circuit 210 into its lockout position will follow.

In order to understand the circuits involved, since the trunk circuits terminating trunk lines extending to the distant exchanges 30 and 40 are not illustrated, it may be assumed, only for the present purpose, that the subscriber line 200 is restricted against completing trunk calls to the distant exchange 20 via the trunk circuit 810 illustrated. In this assumed case, there would be a strap in the line circuit 210 between the blocks 291 and 292 connecting the conductor 621 to the EC conductor 204 of the party line 200. Accordingly, in this case, after seizure by the connector 310 of the trunk 800 extending to the trunk circuit 810, the test circuit, previously described, is completed for energizing the lower winding of the test relay R850 in the trunk circuit 810. This test circuit includes the conductors 621 and 631 to which negative battery potential and positive ground potential are respectively applied incident to operation of the first trunk relay T1; and the test connection extends through the EC wiper of the finder 300 and the EC wiper of the Strowger mechanism 411 of the connector 310, as previously described. Accordingly, in this case, a circuit is completed for energizing the lower winding of the test relay R850 in the trunk circuit 810; whereby the latter relay operates to complete, at the contacts 851, a holding circuit for energizing the upper winding thereof. Also the test relay R850 interrupts, at the contacts 852, the previously traced path for returning ground potential over the C conductor 805 of the trunk 800 so as to bring about the restoration of the switch relays R320 and R490 in the connector 310 and the consequent release of the finder 300 and the connector 310. In this case and incident to the release of the finder 300, the line circuit 210 is operated into its lockout position so that the lockout tone is returned over the party line 200, indicating to the subscriber at the calling party station TS201 that the party line 200 is restricted against the attempted trunk call.

In view of the foregoing description and in accordance with the actual wiring in the line circuit 210 individual to the party line 200, it will be understood that trunk calls are permitted to the distant exchange 20, but are restricted against completion to the distant exchanges 30 and 40; which circumstance is established by the straps between the blocks 291 and 292, and may be readily preset, as required.

In view of the foregoing, it will also be understood that incident to operation of the connector 310 to select any idle trunk in any one of the groups over which connections are extended to the distant exchanges 20, 30 and 40, a test is made to determine whether the particular calling party line is restricted from completing connections to the particular called distant exchange.

Recapitulating, the restricting circuit 600 and the ringing interrupter 700 comprises common equipment that cooperates with the various line circuits individual to the party lines and with the trunk circuits terminating the individual trunks extending to the different distant exchanges and with the connector of the links over which both local and trunk calls are extended for the purpose of determining both trunk restrictions and called party station restrictions. More specifically, in the event one of the connectors 310, etc., is operated as a trunk hunting connector for the purpose of routing a trunk call, the trunk restriction test is performed, and in the event one of the connectors 310, etc., is operated as a party line connector for the purpose of routing a local call, the called party station restriction test is performed. The two different types of restrictions, previously described, are automatically performed by the connector 310 incident to operation thereof and require no cooperation on the part of the subscriber at the calling party station other than the dialing of the directory number corresponding to the desired trunk or local call.

In view of the foregoing, it will be understood that there has been provided an automatic telephone system including party subscriber lines and trunk lines, as well as switching links and common equipment; wherein the common equipment cooperates with a link in use in order to determine in conjunction with a trunk call whether the particular calling subscriber line is restricted against the completion of the particular trunk call and to determine in conjunction with a local call whether the particular called party station on a particular called party subscriber line is restricted against the completion of a local call thereto. In the arrangement the link in use is forcibly released in the event of either of the restrictions mentioned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, a plurality of trunk lines, a corresponding plurality of trunk circuits individual to said trunk lines, said subscriber line being restricted against the completion of trunk calls over one or more of said trunk lines, a switching link controllable over said subscriber line for selectively registering a local call to a particular called station on said party line or a trunk call over a particular one of said trunk lines, a first test circuit including said switching link and said second line circuit for testing to determine whether the called station is operatively connected to said party line, a second test circuit including said switching link and said first line circuit and the one of said trunk circuits individual to said one trunk line for testing to determine whether said subscriber line is restricted against the completion of a trunk call over said one trunk line, means selectively controlled by said first test circuit for completing a local call from said subscriber line via said switching link to the called station on said party line, and means selectively controlled by said second test circuit for completing a trunk call from said subscriber line via said switching link over said one trunk line.

2. The telephone system set forth in claim 1, wherein said switching link includes a wiper set having access to said party line and to said trunk lines, said first test circuit includes said wiper set, and said second test circuit includes said wiper set.

3. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, a plurality of trunk lines, a corresponding plurality of trunk circuits individual to said trunk lines, said subscriber line being restricted against the completion of trunk calls over one or more of said trunk lines, a switching link having access to said party line and to said trunk lines, means included in said switching link and controllable over said subscriber line for selectively registering a local call to a particular called station on said party line or a trunk call over a particular one of said trunk lines, means controlled by said last-mentioned means in response to the registration of a local call to a called station on said party line for operating said switching link to select said party line and controlled by said last-mentioned means in response to the registration of a trunk call to said one trunk line for operating said switching link to select said one trunk line, a first test circuit including said switching link and said second line circuit for testing to determine whether the called station is operatively connected to said party line, a second test circuit including said switching link and said first line circuit and the one of said trunk circuits individual to said one trunk line for testing to determine whether said subscriber line is restricted against the completion of a trunk call over said one trunk line, means operable to release said switching link, first means selectively controlled by said first test circuit for operating said release means, and second means selectively controlled by said second test circuit for operating said release means.

4. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, a plurality of trunk lines, a corresponding plurality of trunk circuits individual to said trunk lines, said subscriber line being restricted against the completion of trunk calls over one or more of said trunk lines, a switching link having access to said party line and to said trunk lines, means included in said switching link and controllable over said subscriber line for selectively registering a local call to a particular called station on said party line or a trunk call over a particular one of said trunk lines, means controlled by said last-mentioned means in response to the registration of a local call to a called station on said party line for operating said switching link to select said party line and controlled by said last-mentioned means in response to the registration of a trunk call to said one trunk line for operating said switching link to select said one trunk line, first means for testing the idle or busy condition of said selected party line, second means for testing the idle or busy condition of said selected one trunk line, a first test circuit including said switching link and said second line circuit and controlled in the event said first test means tests said party line as idle for testing to determine whether the called station is operatively connected to said party line, a second test circuit including said switching link and said first line circuit and the one of said trunk circuits individual to said one trunk line and controlled in the event said second test means tests said one trunk line as idle for testing to determine whether said subscriber line is restricted against the completion of a trunk call over said one trunk line, means selectively controlled by said first test circuit in the event the called station is tested as being operatively connected to said party line for completing a local call from said subscriber line via said switching link to the called station on said party line, and means selectively controlled by said second test circuit in the event said subscriber line is tested as not being restricted against the completion of a trunk call over said one trunk line for completing a trunk call from said subscriber line via said switching link over said one trunk line.

5. The telephone system set forth in claim 4, and further comprising means operable to release said switching link, first means selectively controlled by said first test circuit in the event the called station is tested as not being operatively connected to said party line for operating said release means, and second means selectively controlled by said second test circuit in the event said subscriber line is tested as being restricted against the completion of a trunk call over said one trunk line for operating said release means.

6. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, a plurality of trunk lines, a corresponding plurality of trunk circuits individual to said trunk lines, said subscriber line being restricted against the completion of trunk calls over one or more of said trunk lines, a switching link controllable over said subscriber line for selectively registering a local call to a particular called station on said party line or a trunk call over a particular one of said trunk lines, common equipment, a first test circuit controlled by said common equipment and including said switching link and said second line circuit for testing to determine whether the called station is operatively connected to said party line; a second test circuit controlled by said common equipment and including said switching link and said first line circuit and the one of said trunk circuits individual to said one trunk line for testing to determine whether said subscriber line is restricted against the completion of a trunk call over said one trunk line, means selectively controlled by said first test circuit for completing a local call from said subscriber line via said switching link to the called station on said party line, and means selectively controlled by said second test circuit for completing a trunk call from said subscriber line via said switching link over said one trunk line.

7. A telephone system comprising a pluarlity of party lines each adapted to serve a given maximum number of stations, one or more of said party lines having fewer than said given number of stations operatively connected thereto, a plurality of groups of trunk lines, one or more of said party lines being restricted against the completion of trunk calls over the trunk lines in one or more of said groups, a plurality of links, means controllable from a calling station on a calling one of said party lines for seizing an idle one of said links and for registering therein either a local call to a called one of the stations on a called one of said party lines or a trunk call over one of said groups of trunk lines, first means included in said one link and responsive to the registration of a local call to said called one station on said called one party line for selecting said called one party line, second means included in said one link and responsive to the registration of a trunk call over one of said groups of trunk lines for selecting an idle one of the trunk lines in said one group, first test means responsive to the selection by said one link of said called one party line for testing to determine whether said called one station is operatively connected thereto, second test means responsive to the selection by said one link of said one trunk line in said called one group for testing to determine whether said calling one party line is restricted against the completion of a trunk call over a trunk line in said called one group, means selectively controlled by said first test means for completing a local call from said calling one party line via said one link to said called one station on said called one party line, and means selectively controlled by said second test means for completing a trunk call from said calling one party line via said one link over said one trunk line in said one group.

8. The telephone system set forth in claim 7, and further comprising equipment common to said links, and wherein said first test means comprises a first test circuit including said common equipment, and said second test means comprises a second test circuit including said common equipment.

9. The telephone system set forth in claim 8, wherein said common equipment transmits time-related signals over each of said test circuits, which signals either match or mismatch in each of said test circuits for selective control purposes.

10. The telephone system set forth in claim 7, and further comprising a plurality of line circuits individually associated with said party lines, and a plurality of trunk circuits individually associated with the trunk lines in said groups, and wherein said first test means comprises a first test circuit including said one link and the line circuit individual to said called one party line, and said second test means comprises a second test circuit including the line circuit individual to said calling one party line and said one link and the trunk circuit individual to said one trunk line in said called one group.

11. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, first strapping means individual to said second line circuit marking the one or more stations that are absent from said party line, a plurality of trunk lines, a corresponding plurality of trunk circuits individual to said trunk lines, second strapping means individual to said first line circuit marking said subscriber line as being restricted against the completion of trunk calls over one or more of said trunk lines, a switching link controllable over said subscriber line for selectively registering a local call to a particular called station on said party line or a trunk call over a particular one of said trunk lines, first means responsive to the registration of a local call to a called station on said party line for testing to determine whether the called station is operatively connected to said party line, second means responsive to the registration of a trunk call over a called one of said trunk lines for testing to determine whether said subscriber line is restricted against the completion of a trunk call over said one trunk line, said first testing means comprising a first test circuit including said switching link and said first strapping means, said second testing means comprising a second test circuit including said second strapping means and said switching link and the trunk circuit individual to said one trunk line, means selectively controlled by said first testing means for completing a local call from said subscriber line via said switching link to the called station on said party line, and means selectively controlled by said second testing means for completing a trunk call from said subscriber line via said switching link over said one trunk line.

12. A telephone system comprising a subscriber line, a first line circuit individual to said subscriber line, a party line adapted to serve a given maximum number of stations, a plurality of stations fewer in number than said given number operatively connected to said party line, a second line circuit individual to said party line, first strapping means individual to said second line circuit marking the one or more stations that are absent from said party line, a plurality of trunk lines, a corresponding plurality of trunk circuits individual to said trunk lines, second strapping means individual to said first line circuit marking said subscriber line as being restricted against the completion of trunk calls over one or more of said trunk lines, a switching link controllable over said subscriber line for selectively registering a local call to a particular called station on said party line or a trunk call over a particular one of said trunk lines, first means responsive to the registration of a local call to a called station on said party line for preparing a first test circuit including said switching link and said first strapping means, second means responsive to the registration of a trunk call over a called one of said trunk lines for preparing a second test circuit including said second strapping means and said switching link and the trunk circuit individual to said one trunk line, means controlled in the event said first test circuit is not completed for completing a local call from said subscriber line via said switching link to the called station on said party line, and means controlled in the event said second test circuit is not completed for completing a trunk call from said subscriber line via said switching link over said one trunk line, 13. The telephone system set forth in claim 12, wherein said first line circuit is operative into a lock-out position to remove said subscriber line from service, and further comprising means responsive to the completion of either said first test circuit or said second test circuit for operating said first line circuit into its lock-out position.

14. The telephone system set forth in claim 12, wherein said first and second means are controlled in timed relation by a common interrupter.

References Cited in the file of this patent

UNITED STATES PATENTS 2,524,774 Deakin ---------------- Oct. 10, 1950